United States Patent Office 2,853,396
Patented Sept. 23, 1958

2,853,396

PROCESS FOR BODYING VEGETABLE DRYING OILS WITH RESINS AND THE PRODUCT THEREOF

Donald F. Koenecke, Westfield, N. J., assignor to Esso Research and Engineering Company, a corporation of Delaware No Drawing. Original application July 16, 1949, Serial No. 105,261, now Patent No. 2,709,662, dated May 31, 1955. Divided and this application December 29, 1953, Serial No. 401,084

10 Claims. (Cl. 106—227)

This invention relates to an improvement in drying oils and more particularly to an improvement in accelerating the heat bodying rate of vegetable oils without depreciating the drying rate or film forming properties of the product and is a division of application Ser. No. 105,261, filed July 16, 1949, now Patent No. 2,709,662, issued May 31, 1955.

When vegetable oils such as linseed oil are cooked to increase the viscosity in customary manner, a reaction time of about 12 hours is required to effect the change. The temperatures necessary for this purpose are in the range of 295 to 305° C., and the conventional heating procedure is therefore usually accompanied by an undesirable darkening of the treated oil as well as an appreciable loss of material due to the extended cooking. Attempts have been made in the past to increase the low rate of production and to reduce the concomitant degradation of the oil. These previous attempts have been centered on the use of reactive monomers such as styrene, butadiene, cyclopentadiene, or of catalysts such as oxygen or litharge, but in varying degrees the use of any these materials meant a high loss or an impairment of drying rate, color or some other property of the eventual product. Thus the improvement in cooking rate was obtained only at a serious sacrifice which could not always be afforded depending on the vegetable oil used and the ultimate use contemplated therefor.

It has now been discovered that certain synthetic oily polymers of diolefins have a surprisingly beneficial accelerating effect on the cooking rate of vegetable drying oils without causing loss of color and often actually causing an improvement in hardness and other properties.

Vegetable drying or semi-drying oils to which the present invention is applicable include linseed oil, soybean oil, rapeseed oil, tung oil, cottonseed, perilla, oiticica, corn, dehydrated castor, fish oil, sunflower seed, safflower and other vegetable oils containing a substantial proportion of glycerides of linoleic and/or linolenic acid.

The synthetic oils useful for catalyzing the cooking reaction in accordance with the present invention are oily polymers of butadiene, isoprene, dimethyl butadiene, piperylene, methyl pentadiene or other conjugated diolefins having four to six carbon atoms per molecule. Instead of polymerizing any of the aforesaid diolefins alone, they may be copolymerized in admixtures with each other or in admixtures with minor amounts of ethylenically unsaturated monomers copolymerizable therewith, e. g., with 5 to 30% of styrene, styrenes having alkyl groups substituted on the ring such as para methyl styrene, dimethyl styrene or diethyl styrene, acrylonitrile, methacrylonitrile, methyl acrylate, methyl methacrylate, vinyl isobutyl ether, methyl vinyl ketone, and isopropenyl methyl ketone. Such synthetic oils may be advantageously prepared by mass polymerization either in the presence of a hydrocarbon soluble peroxide catalyst such as benzoyl peroxide or cumene hydroperoxide, or in the presence of metallic sodium when the monomers consist of a diolefin or of a mixture of a diolefin with a styrene compound. Suitable polymerization procedures are illustrated below in runs A and B. Throughout the present description it will be understood that all proportions are expressed on a weight basis unless otherwise specified.

*Run A.*—For example, 100 parts of butadiene-1,3, 50 parts of straight run mineral spirits boiling between 150 and 200° C. (Varsol), 3 parts of t-butyl hydroperoxide (60% pure) and 0.75 parts of diisopropyl xanthogen disulfide are heated in a closed reactor at about 90° C. for 40 hours, whereupon the residual pressure is released and unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some t-butyl alcohol. This solution of polymer is then preferably fractionated to remove the dimer and usually adjusted to 50% non-volatile matter content. The non-volatile constituent, which is the oily polymer of butadiene, has a molecular weight between 1,000 and 10,000, preferably between 2,000 and 5,000. It will be understood, of course, that the foregoing procedure is only illustrative and that is can be modified in many ways, particularly as described in U. S. patent application Serial No. 782,850 of Arundale et al., filed on October 29, 1947, now Patent No. 2,586,594, issued February 19, 1952 which describes alternative monomers, catalysts, reaction diluents, polymerization modifiers, suitable ranges of proportions of the various ingredients, suitable ranges of polymerization conditions, etc.

*Run B.*—An alternative polymerization method using sodium as catalyst is illustrated as follows: 80 parts of butadiene-1,3, 20 parts of styrene, 200 parts of straight run mineral spirits boiling between 150 and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or the like and filtered. The colorless filtrate is then fractionally distilled to remove the alcohol and modifiers such as dioxane. Finally, additional hydrocarbon solvent is preferably distilled off until a product containing about 50%–95% non-volatile matter is obtained, the non-volatile matter being a drying oil having a molecular weight below 10,000 preferably between about 2,000 to 5000.

Again it will be understood that the described sodium polymerization method may be varied considerably as by omitting the styrene co-reactant; or by adding the styrene only after the polymerization of butadiene monomer had begun; or dioxane may be replaced by 10 to 35 parts of another ether modifier having more than 2 carbon atoms such as methyl ethyl ether, or the modifier may be omitted altogether, especially when it is not essential to obtain a perfectly colorless product. Similarly, isopropanol is not necessary, though aliphatic alcohols of less than 6 carbon atoms generally have the beneficial effect of promoting the reaction when present in amounts ranging from about 2 to 50% based on the weight of sodium catalyst. Furthermore, the mineral spirits may be replaced by other inert hydrocarbon diluents boiling between about —15° C. and 200° C., e. g., butane, benzene, xylene, cyclohexane and the like. The diluents are usually used in amounts ranging from 50 to 500 parts per 100 parts of monomer. The reaction temperature may vary between about 40° C. and 100° C., preferably around 65 to 85° C. As a catalyst, 0.1 to 10 parts of dispersed metallic sodium is used per 100 parts of monomers, sodium particle sizes below 100 microns being particularly effective.

In general the synthetic drying oils useful for catalyzing the cooking rate of vegetable oils in accordance with the present invention can be characterized as being stable up to a temperature of about 305° C.

The following examples will serve to illustrate the mode of operation as well as the advantages of the present invention, though it will be understood that various other embodiments or modifications not specifically illustrated herein are possible without departing from the spirit or scope of the invention. For instance, instead of co-reacting the vegetable drying oil with the synthetic drying oil in a non-catalytic thermal process, the heat bodying reaction may be further accelerated by operating in the presence of a suitable catalyst, e. g., fuller's earth or other active clays.

EXAMPLE 1

A mixture of 167.2 parts of alkali refined linseed oil and 35.0 parts of a synthetic oil having a viscosity of 9 poises and containing 50% of oily polybutadiene in straight run mineral spirits, which oil was prepared in accordance with the procedure described in run A above, was gradually heated in one hour from room temperature to 288° C. in a stainless steel kettle, i. e. in an open vessel, held between 288 and 290° C. for 2½ additional hours under a blanket of carbon dioxide and allowed to cool. The resulting oil had the following characteristics:

Gardner color_____ 10–11.
Gardner viscosity_____ $Z_3$–$Z_4$ (54 poises).
Cure point [1]_____ 117 seconds.

[1] Gel time of a thin film on a 200° C. hot plate.

A 50% solution of this heat bodied oil of the invention was prepared by mixing it with an equal amount of straight run mineral spirits boiling between 150 and 200° C. (Varsol No. 2), and its air drying rate was compared with a solution prepared by mixing the same solvent with an equal amount of a commercial bodied linseed oil containing about 10% of tung oil. The commercial oil had the following characteristics:

Gardner color_____ 7.
Gardner viscosity_____ $Z_2$ (36.2 poises).
Cure point_____ 152 seconds.

In evaluating the drying rates of the two oil solutions, 0.5% lead and 0.05% manganese in the form of naphthenates were added thereto and the solutions were then poured on tin plate panels. The results obtained are indicated below, the drying rate being measured on an arbitrary scale where 0 represents a completely tack-free film, 6 represents a film set to touch and 3 represents a film which is dust-free.

| Sample | 1 Hr. | 2 Hrs. | 4 Hrs. | 7.5 Hrs. | 24 Hrs. |
|---|---|---|---|---|---|
| Invention | 4–5 | 2 | 1 | 1 | 0 |
| Commercial oil | 3 | 1 | 1 | 1 | 0 |

It will be observed that despite the relatively short bodying period the oil processed in accordance with the invention had a drying rate which was only slightly slower in the initial three hours, but caught up with the commercial oil thereafter. Both oils baked satisfactorily in one hour at 120° C. with the same drier present. A comparison of the properties of air dried and baked films summarized in Table I below indicates that the two oils were very nearly equivalent to each other when air dried and also when baked.

*Table I*

| Sample | Water Resist. | Soap Resist. | Grease Resist. | Caustic Resist. | Flexibility, 180° Blend Test |
|---|---|---|---|---|---|
| Air Dried (48 Hours): | | | | | |
| Invention | 0 | 9 | 0 | 9 | Unaffected. |
| Commercial | 0 | 9 | 0 | 5 | Do. |
| Baked (1 Hr. @ 120° C.): | | | | | |
| Invention | 0 | 3 | 4 | 6 | Do. |
| Commercial | 2 | 8 | 3 | 7 | Do. |

Code: 0—unaffected; 9—failure.

All evaluations of film resistance described in this specification have been determined as follows:

*Water resistance.*—A piece of filter paper was placed on top of the tested film and a small amount of water dropped on the paper. The wet paper was left in contact with the film for 5 hours.

*Soap resistance.*—A drop of 2% solution of commercial sodium soap was formed on a filter paper lying on top of the tested film and the wet paper left in contact with the film for 2 hours.

*Grease resistance.*—A piece of filter paper saturated with a 50–50 mixture of butter and oleic acid was left in contact with the film for 2 hours.

*Caustic resistance.*—A piece of filter paper on which a drop of a 1% aqueous solution of NaOH had been dropped was left in contact with the tested film for one hour.

EXAMPLE 2

*Run I.*—600 parts of alkali-refined linseed oil were gradually heated to 295° C. over a period of one hour, held at that temperature for two hours under a blanket of carbon dioxide while stirring and finally cooled slowly to room temperature.

*Run II.*—540 parts of alkali-refined linseed oil were blended with a solution containing 60 parts of the polybutadiene oil described in Example 1 and 74 parts of a straight run mineral spirits boiling between 150 and 200° C., and the blend was heated at 295° C. on the same heat cycle as described in run I above. The mineral spirits were boiled off.

*Run III.*—A mixture having the same composition as in run II was gradually heated to 260° C. over a period of about 45 minutes and held at that temperature for 2 hours.

An evaluation of the three oils cooked as just described is given in Table II:

*Table II*

| Sample | Gardner Color | Gardner Viscosity | Viscosity (Poise) | Percent Cooking Loss of Oil +Polymer [3] |
|---|---|---|---|---|
| Run I (295° C.) [1] | 7 | M–N | 3.30 | 3.5 |
| Run II (295° C.) [2] | 7 | S | 5.00 | 2.0 |
| Run III (260° C.) [2] | 6–7 | F–G | 1.55 | 0.5 |

[1] Prior art.
[2] Invention.
[3] Exclusive of the mineral spirits solvent.

Comparison of runs I and II shows that the addition of synthetic drying oil causes the natural oil to body more intensively than when no synthetic oil is present during the heating under the same conditions, and the cooking loss is reduced by almost one half when the synthetic oil is present. Furthermore, the viscosity data indicate that the same degree of bodying as was obtained in run I can be obtained at substantially lower temperatures when the synthetic oil is present, and by this expedient the cooking loss can be reduced still further as illustrated by run III. An interpolation of the tabulated data indicates that a bodied oil as viscous and also otherwise at least as good as the product obtained in one hour at 295° C. by the prior art method can be obtained in accordance with the invention in the same length of time at a temperature of about 275° C., resulting not only in a considerable saving in thermal energy but also in a very important reduction of the cooking loss down to about 1% of the drying oil charged. Alternatively, instead of reducing the cooking temperature, the addition of the synthetic oil allows the cooking step to be carried out in a shorter time span at the same temperature than is possible in the absence of the synthetic oil. At the same time the possibility of operating at lower temperatures or for shorter times is responsible for an improvement in color. All of the foregoing is characteristic of the unexpected advantages of the novel cooking process. That the latter does not impair the properties of the vegetable oil or of the dried films prepared therefrom but actually improves the hardness and occasionally also other properties of the films is shown by the following data obtained on films cast on tin plate panels in the presence of 0.5% lead and 0.05% manganese naphthenate drier.

| Sample | Sward Hardness | Flexibility [1] (180° Blend) | Resistance to— | | | |
|---|---|---|---|---|---|---|
| | | | $H_2O$ [1] | Soap [1] | Grease [1] | Caustic [1] |
| Air Dried (2 Days): | | | | | | |
| Run I | 4 | 0 | 2 | 9 | 5 | 9 |
| Run II | 8 | 0 | 2 | 9 | 5 | 9 |
| Run III | 6 | 0 | 3 | 9 | 5 | 9 |
| Baked (1 Hr. @ 120° C.): | | | | | | |
| Run I | 7 | 0 | 0 | 8 | 4 | 9 |
| Run II | 12 | 0 | 0 | 4 | 4 | 8 |
| Run III | 14 | 0 | 0 | 4 | 4 | 9 |

[1] Code: 0—Unaffected or excellent; 9—Failure.

EXAMPLE 3

In this example a polybutadiene oil prepared in the presence of sodium catalyst was used to accelerate the heat bodying of a vegetable drying oil. The synthetic oil used was prepared substantially as described in run B given earlier, herein, except that styrene was omitted from the polymerization mixture and instead of a solution of a butadiene homopolymer in mineral spirits was prepared and after the usual finishing steps reduced by distillation to a 50% non-volatile matter content.

For comparison, two linseed oil samples were heated to 295° C. and held at that temperature for three hours on the same heat cycle. In run III representing the prior art, 300 g. of alkali-refined linseed oil were heated in the absence of any added materials whereas in run IV illustrating the invention 30 g. of the polybutadiene oil dissolved in an equal amount of mineral spirits were added to 300 g. of the same linseed oil. The color and viscosity of each batch were determined during the cooking step at one hour intervals and the following results were obtained:

*Changes in cooking step*

GARDNER COLOR

| Sample | Initial | 1 Hr. | 2 Hrs. | 3 Hrs. |
|---|---|---|---|---|
| Run III | 6 | 7 | 7–8 | 8–9 |
| Run IV | 6 | 7 | 8–9 | 8–9 |

VISCOSITY (POISE)

| Run III | 0.5 | 1.1 | 2.75 | 5.9 |
| Run IV | 0.5 | 4.5 | 14.3 | 31.6 |

It will be noticed from the above that the heat bodying in run IV, which illustrates the invention, occurs at a very much faster rate than in run III and by interpolation it can be seen that the viscosity stage reached in run IV after about 70 minutes is equivalent to the stage reached in run III after three hours. This necessarily results not only in a saving in heat and a reduction of oil lost, but furthermore the product obtained is of noticeably lighter color than the oil bodied to the same consistency by the prior art process. Both oils had the same air drying rates, being only slightly tacky after 4 hours and virtually tack-free after 24 hours in the presence of 0.5% lead and 0.05% manganese naphthenate drier.

The properties of films cast from the above oils on tin plate panels were as follows:

| Sample | Air Dried (48 Hours) | | | | Baked (1 hr. at 120° C.) | | | |
|---|---|---|---|---|---|---|---|---|
| | Resistance to— | | | | Resistance to— | | | |
| | Water | Soap | Grease | NaOH | Water | Soap | Grease | NaOH |
| Run III | 0 | 8 | 3 | 7 | 0 | 5 | 9 | 9 |
| Run IV | 4 | 8 | 3 | 8 | 0 | 0 | 0 | 2 |

Again it is seen that the air dried films from the oil treated in accordance with this invention are approximately equal to the conventionally treated oil except for a slightly inferior resistance to water. On the other hand the baked film from the oil treated according to the invention was decidedly superior to the prior art oil in terms of resistance to soap, grease and alkali. Otherwise there was no difference in physical properties, all of the tested films being completely tack-free and perfectly flexible as determined by bending the coated steel panels through a 180 degree angle. Both air dried films were slightly soft after 48 hours, but both baked films were firm.

EXAMPLE 4

The present invention is also applicable to oleoresinous varnishes. This is illustrated by the following runs V and VI wherein the reactants indicated in the subjoined formulas were heated in 1-gal. stainless steel kettles to 295° C. on the same time-temperature curve under a carbon dioxide blanket with frequent stirring. After the temperature of 295° C. was reached, each varnish was held at that temperature until the cure time of a thin film on a 200° C. hot plate was brought down to 40–45 seconds. Thereafter each kettle was quenched in water and the oleoresinous varnish was diluted with an equal weight of straight run mineral spirits boiling between 150 and 200° C.

*Formulas*

RUN V 427 g. ester gum (pentalyn A)
824 g. alkali-refined linseed oil
125 g. polybutadiene oil [1] (prepared by the method described in run A; added to the linseed oil and ester gum mix as a solution containing 31 g. of straight run mineral spirits)

[1] About 10 weight percent based on the resin and linseed oil.

RUN VI 427 g. ester gum (pentalyn A)
824 g. alkali-refined linseed oil

*Cooking observations*

| | Run V | Run VI |
|---|---|---|
| Cook time, hours | 3:00 | 5:02 |
| Cook loss, weight percent | 8.1 | 10.1 |
| Viscosity, poise | 4.85 | 2.12 |
| Color, Gardner | 13 | 17 |

It will be noticed that the cook time required to produce a varnish of equivalent cure time can be reduced by about 40% in accordance with the present invention. As a consequence of this reduced cooking time the cook loss is also reduced appreciably and a cooked varnish of lighter color is obtained.

When 0.5 weight percent of lead and 0.05 weight percent of manganese in the form of naphthenates were added to each of the cooked varnishes and the latter applied to tin plate panels, films having the following properties were obtained:

|  | Resistance [1] to— | | | | Hardness | Tack | Flexibility (180° Bend) |
|---|---|---|---|---|---|---|---|
|  | Water | Soap | Grease | NaOH | | | |
| Air Dried Films (48 Hours): | | | | | | | |
| Run V | 0 | 4 | 0 | 4 | Good | None | Some Cracking. |
| Run VI | 0 | 4 | 0 | 3 | ---do--- | ---do--- | Do. |
| Baked Films (1 Hr. @ 120° C.): | | | | | | | |
| Run V | 0 | 0 | 0 | 3 | ---do--- | ---do--- | Unaffected. |
| Run VI | 0 | 0 | 0 | 0 | ---do--- | ---do--- | Do. |

[1] Code: 0—Unaffected; 3-4—Appreciable softening; 9—Failure.

It will be noticed that the films resulting from the varnish processed according to this invention were substantially equivalent to the prior art product in all properties tested.

The accelerated varnishes of this invention can also be used successfully in the preparation of enamels. For example a white enamel was prepared from the varnish obtained in run V by mixing to a smooth paste 245° g. of titanium dioxide pigment and 200 g. of the varnish and grinding the paste to enamel particle size on a pigment roller mill. The resulting paste was mixed further with an additional 400 g. of the same varnish, 15 g. of 10% lead and 1% of manganese drier (the drier being a solution of metal napththenates in xylol) and 7.5 g. of 2% cobalt naphthenate drier. In a control run the same procedure was followed using the varnish produced in run VI. Both enamels dried satisfactorily when applied by brushing or spraying and the resulting films were hard and glossy. In order to compare their weathering characteristics, two coats of each enamel were sprayed on primed bonderized steel panels which were then exposed to the conditions of an Atlas Weather-O-Meter for 600 hours, said to be the equivalent of 600 days of exterior exposure. Both white enamels behaved the same way in that they lost gloss to an eggshell appearance and displayed some microcracking at the end of this rather severe test period, showing that the accelerated heat bodying treatment of this invention has no adverse effect on the properties of the resulting enamels. Similar results were also obtained with red enamels containing toluidine red pigment, both the accelerated and the unaccelerated enamel showing equal fading after 600 hours' exposure in the Weather-O-Meter.

EXAMPLE 5

In this example the accelerating effect of a polybutadiene oil was tested in connection with an oleoresinous varnish base containing a synthetic all-hydrocarbon resin prepared by copolymerization of 55 parts butadiene and 45 parts of diisobutylene at —15° C. with aluminum chloride catalyst, as described in U. S. patent applications Serial No. 610,212, filed August 10, 1945, now Patent No. 2,476,000, issued July 12, 1949 and Serial No. 638,514, filed December 29, 1945, now Patent No. 2,546,020, issued March 20, 1951.

Formulas

RUN VII 650 g. hydrocarbon resin
910 g. alkali-refined linseed oil

RUN VIII 650 g. hydrocarbon resin
910 g. alkali-refined linseed oil
90 g. polybutadiene oil [1] (prepared by method described in run A; added to linseed oil and resin mix as a solution containing 90 g. of straight run mineral spirits)

[1] About 10 weight percent based on linseed oil.

In each run all the reactants specified above were placed in a 1-gallon stainless steel kettle, heated to 295° C. under a carbon dioxide blanket with frequent stirring and maintained at that temperature until the cure time of a thin film of the varnish base on a 200° C. hot plate was reduced to 55 seconds. Thereafter the kettle was quenched in water and the varnish base mixed with an equal weight of straight run mineral spirits.

Results

|  | Run VII | Run VIII |
|---|---|---|
| Cook time, hours | 4:08 | 3:12 |
| Viscosity, poise | .05 | Gel |

It will be noticed that in accelerated run VIII the varnish was cooked much too far although the cooking time thereof was almost a whole hour shorter than in unaccelerated run VII. The formation of a gel, as opposed to a varnish bodied only to a viscosity of 0.5 poise in a substantially longer time, clearly illustrates the potency of synthetic butadiene oils as accelerators for the heat bodying or polymerization of vegetable oils and of oleoresinous varnishes.

EXAMPLE 6

In this example the accelerating effect of a butadiene-styrene copolymer oil was tested in connection with an oleoresinous varnish containing alkali-refined soybean oil and a hydrocarbon resin prepared by the copolymerization of 50 parts of butadiene and 50 parts of xylene at —15° C. with aluminum chloride catalyst.

Formulas

RUN IX 150 g. hydrocarbon resin
232 g. alkali-refined soybean oil

RUN X 150 g. hydrocarbon resin
232 g. alkali-refined soybean oil
38.2 g. butadiene-styrene oil[1] (prepared as described in run B; added to soybean oil and resin mix as a solution containing 2 g. of straight run mineral spirits)

[1] 10 weight percent based on soybean oil and resin.

The specified reactants were heated in an aluminum kettle under a nitrogen blanket with stirring to 295° C. and held at that temperature until the cure time of a thin film of the varnish base on a 200° C. hot plate was reduced to 60 seconds. Thereafter the varnish base was cooled quickly to 230° C. and mixed with an equal weight of straight run mineral spirits.

Results

|  | Run IX | Run X |
| --- | --- | --- |
| Cook time, hrs | 11.42 | 5.52 |
| Cook loss, wt. percent | 16.0 | 11.0 |
| Viscosity, poise | 4.0 | 2.4 |
| Color, Gardner | 14 | 12–13 |

It will be noticed again that the cooking time required for the accelerated varnish is only about one-half that required to polymerize the control varnish to a state characterized by a comparable cure time. Furthermore, in consequence of the reduced cooking time the amount of valuable oil lost during the cooking can be seen to have been reduced by about one-third. The color of the cooked accelerated varnish was again lighter than the non-accelerated varnish.

To show that the cooked accelerated varnish has approximately the same cure time or drying rate as the more viscous product obtained by cooking of the non-accelerated varnish, the products of runs IX and X were mixed with 0.5% lead and 0.05% manganese naphthenate drier, and coated on tin plate panels and tested.

Air drying rate[1]

| Sample | Hours | | | | |
| --- | --- | --- | --- | --- | --- |
|  | 1 | 2 | 4 | 6 | 24 |
| Run IX | 7 | 3 | 1 | 1 | 0 |
| Run X | 6 | 3 | 2 | 1 | 0 |

[1] Rating: 9—wet; 6—set-to-touch; 3—dust-free; 0—tack-free.

The properties of air dried and baked films prepared from each of the varnishes were also compared:

AIR DRIED, 1 WEEK

| Sample | Film Resistance [1] to — | | | | Hardness | Flexibility 180° Bend Test |
| --- | --- | --- | --- | --- | --- | --- |
|  | Water | Soap | Grease | NaOH | | |
| Run IX | 5 | 4 | 0 | 0 | Good | Unaffected. |
| Run X | 3 | 0 | 0 | 0 | do | Do. |

BAKED, 1 HOUR @ 120° C.

| Run IX | 0 | 0 | 0 | 0 | Good | Unaffected. |
| --- | --- | --- | --- | --- | --- | --- |
| Run X | 0 | 0 | 0 | 4 | do | Do. |

[1] Rating: 0—Unaffected; 1–3—Discolored; 4–6—Softened and less adherent; 7–8—Pinholed or blistered; 9—Film removed.

Again it can be seen that the two varnishes have approximately equal properties, air-dried films of the accelerated varnish having somewhat superior water and soap resistance than air-dried films of the ordinary varnish whereas in the baked state films of the ordinary varnish show somewhat better resistance to alkali than the corresponding film obtained from the accelerated varnish.

In summary, the invention illustrated by the foregoing examples consists of accelerating the cooking rate of drying or semi-drying vegetable oils by adding thereto about 2 to 25%, preferably about 5 to 15% of an oily butadiene polymer or copolymer and thereafter cooking the mixture in substantial absence of oxygen at a temperature of about 230 to 330° C., preferably 265° C. to 300° C. until the cooked oil has reached the desired consistency or cure time. Instead of applying the invention to the cooking of vegetable oils alone, it can be applied with equal benefit to the cooking of oleoresinous varnishes containing a vegetable oil and about 10 to 70% of a resin such as ester gum, various oil soluble hydrocarbon resins, modified phenolics, maleic-treated resins and esters, and natural resins. The principal advantage of the invention lies in the fact that heat bodying of vegetable oils, which is essentially a polymerization phenomenon, can be accomplished in a shorter time or at a lower temperature or both, and consequently the cook loss as well as the darkening of the valuable charge is kept to a minimum. It follows from the foregoing that the invention offers important economies in heat, time and material, without in any way impairing the properties of the eventual product.

In the course of investigating the present invention, it was established that a substantial preponderance of the vegetable oil over the synthetic butadiene oil is desirable as far as cooking rate is concerned. At the same time, however, the discovery was made that if the proportion is reversed, as by co-reacting about 70 parts of oily butadiene polymer with 30 parts of dehydrated castor oil at 295° C. for eighty minutes, varnishes derived from the resulting base have been found to have an excellent ability to wet metallic and glass surfaces. This is quite surprising in view of the fact that, in the absence of vegetable oil, the drying oils synthesized from butadiene have a tendency to creep and crawl into rivulets, leaving a discontinuous film when applied to metal or glass.

I claim:

1. A process for producing a drying oil composition which comprises admixing 2–25% of a nonvolatile oily copolymer prepared by copolymerizing 95 to 70 weight percent of a $C_4$ to $C_6$ conjugated diolefin and 5 to 30 weight percent of a styrene, said copolymer having a molecular weight of from 1,000 to 10,000 and being stable up to 305° C., with 30–90% of a vegetable oil chosen from the group consisting of drying and semidrying oils and 10–70% of an oil-soluble resin, and heating the resulting admixture at a temperature between 265° and 300° C. until the vegetable oil has reached the desired consistency.

2. Process according to claim 1 in which the diolefin is butadiene-1,3.

3. Process according to claim 2 in which the polymer oil is prepared by copolymerizing 80% butadiene and 20% styrene.

4. A drying oil composition of improved drying characteristics which comprises a thermally treated admixture, said admixture consisting essentially of 2–25 weight percent of nonvolatile oily sodium copolymer prepared by copolymerizing 95 to 70 weight percent of a conjugated $C_4$ to $C_6$ diolefin and 5 to 30 weight percent of a styrene, said copolymer having a molecular weight of from 1,000 to 10,000 and being stable up to about 305° C., 30–90 weight percent of a vegetable oil chosen from the group consisting of drying and semidrying oils and 10–70 weight percent of an oil-soluble resin, wherein the thermal treatment of said admixture has been affected at 265 to 300° C. until the vegetable oil has reached the desired consistency.

5. Composition according to claim 4 in which the diolefin is butadiene-1,3.

6. Composition according to claim 5 in which the polymer is composed of 80% of combined butadiene and 20% of combined styrene.

7. Process according to claim 2 in which the vegetable oil is linseed oil.

8. Process according to claim 2 in which the vegetable oil is soybean oil.

9. Composition according to claim 4 in which the vegetable oil is linseed oil.

10. Composition according to claim 4 in which the vegetable oil is soybean oil.

References Cited in the file of this patent

UNITED STATES PATENTS

| 2,443,044 | Lycan et al. | June 8, 1948 |
| --- | --- | --- |
| 2,536,845 | Gleason | Jan. 2, 1951 |
| 2,569,383 | Leyonmark et al. | Sept. 25, 1951 |
| 2,653,956 | Marhofer et al. | Sept. 29, 1953 |
| 2,709,662 | Koenecke et al. | May 31, 1955 |